United States Patent
Shi

(10) Patent No.: US 10,079,882 B2
(45) Date of Patent: Sep. 18, 2018

(54) METHOD AND SYSTEM FOR SYNCHRONIZING INFORMATION TO CONTACTS ON CLOUD PLATFORM

(71) Applicant: HUIZHOU TCL MOBILE COMMUNICATION CO., LTD., Huizhou, Guangdong (CN)

(72) Inventor: Zhen Shi, HuiZhou (CN)

(73) Assignee: HUIZHOU TCL MOBILE COMMUNICATION CO., LTD., HuiZhou, Guangdong (CN)

(*) Notice: Subject to any disclaimer, the term of this patent is extended or adjusted under 35 U.S.C. 154(b) by 733 days.

(21) Appl. No.: 14/438,759

(22) PCT Filed: May 21, 2014

(86) PCT No.: PCT/CN2014/077954
§ 371 (c)(1),
(2) Date: Apr. 27, 2015

(87) PCT Pub. No.: WO2015/127722
PCT Pub. Date: Sep. 3, 2015

(65) Prior Publication Data
US 2016/0191618 A1  Jun. 30, 2016

(30) Foreign Application Priority Data
Feb. 28, 2014 (CN) .......................... 2014 1 0070691

(51) Int. Cl.
G06F 17/30 (2006.01)
H04L 29/08 (2006.01)

(52) U.S. Cl.
CPC .... *H04L 67/1095* (2013.01); *G06F 17/30345* (2013.01); *G06F 17/30575* (2013.01); *H04L 67/02* (2013.01); *H04L 67/1097* (2013.01)

(58) Field of Classification Search
CPC .................................................. G06F 17/30575
See application file for complete search history.

(56) References Cited

U.S. PATENT DOCUMENTS

| 2010/0076926 A1* | 3/2010 | Lecciso | H04M 1/274516 |
| | | | 707/610 |
| 2010/0120453 A1* | 5/2010 | Tamchina | H04M 1/274516 |
| | | | 455/466 |

(Continued)

FOREIGN PATENT DOCUMENTS

| CN | 102014168 | 4/2011 |
| CN | 102769640 | 11/2012 |

(Continued)

OTHER PUBLICATIONS

Chinese Patent Application Publication # CN103095829, published on May 8, 2013, by Yao et al.*

(Continued)

*Primary Examiner* — Mahesh H Dwivedi
(74) *Attorney, Agent, or Firm* — Hauptman Ham, LLP

(57) ABSTRACT

The present invention relates to register a cloud account and allocate a cloud storage space. Information about contact people in the directory at each user's terminal is backed up to the cloud storage space for each user's terminal. The contact information of each user's terminal is stored in its cloud storage space. Once the contact information is changed, the changed contact information is updated in the cloud storage space for each user's terminal and simultaneously in the cloud storage space for all of the contact people in the directory at the user's terminal. The updated contact information about the user's terminal can be downloaded from the cloud storage space. The information about the contact people among the user's terminals can be transferred with one another.

17 Claims, 2 Drawing Sheets

(56) References Cited

U.S. PATENT DOCUMENTS

| | | | | |
|---|---|---|---|---|
| 2010/0267367 A1* | 10/2010 | Booth | ............. | H04M 1/274516 455/414.1 |
| 2012/0309365 A1* | 12/2012 | Wang | ................... | H04M 3/436 455/414.1 |
| 2013/0054634 A1* | 2/2013 | Chakraborty | ....... | H04L 67/1091 707/769 |
| 2013/0132547 A1* | 5/2013 | Reed | ...................... | H04L 41/00 709/223 |
| 2015/0207899 A1* | 7/2015 | Yoshikawa | ........... | H04L 67/306 707/610 |
| 2015/0222701 A1* | 8/2015 | Zehavi | ................ | H04L 67/1095 709/204 |
| 2016/0309309 A1* | 10/2016 | Dong | ................ | H04M 3/42144 |
| 2017/0139973 A1* | 5/2017 | Huang | ................... | H04L 67/10 |
| 2017/0163781 A1* | 6/2017 | Seshan | ................ | G06F 3/04817 |

FOREIGN PATENT DOCUMENTS

| | | |
|---|---|---|
| CN | 103095829 | 5/2013 |
| CN | 103581111 | 2/2014 |

OTHER PUBLICATIONS

Article entitled "Maxpro Cloud Appliance Getting Started Guide", dated Dec. 2012, by Maxpro.*

* cited by examiner

METHOD AND SYSTEM FOR SYNCHRONIZING INFORMATION TO CONTACTS ON CLOUD PLATFORM

CROSS REFERENCE TO RELATED APPLICATION

This application claims the priority of International Application No. PCT/CN2014/077954, filed on May 21, 2014, which claims priority to Chinese Application No. 201410070691.2, filed on Feb. 28, 2014. The entire disclosures of each of the above applications are incorporated herein by reference.

BACKGROUND OF THE INVENTION

1. Field of the Invention

The present invention relates to communications field of mutual network, and more particularly, to a method for synchronizing information on a cloud platform and a system adopting the method.

2. Description of the Prior Art

Currently, cloud computing industry in China develops surprisingly rapidly. Cloud computing engulfs the information technology (IT) world. Especially, cloud computing developed rapidly in 2012. A variety of cloud technologies and cloud plans launched in succession in 2012, such as early Amazon Cloud Drive, iCloud launched by Apple Inc. in 2011, and System Center launched by Microsoft Corp. in April of 2012, for targeting the market of cloud computing.

Because of the growth of cloud technology, all sorts of cloud products developed by the cloud platform abound. Besides, cloud computing applies to more and more fields such as cloud storage, cloud sync, cloud alliance, cloud games, cloud safety, and cloud contact.

In the conventional technology, information about many contact people is stored in users' mobile terminals. The information fails to be automatically updated in time. Sometimes, stored information about one of the user's contact people changes, and the user is unable to contact the in time. It is inconvenient for the user.

Therefore, the conventional technology still needs to be revised and improved.

SUMMARY OF THE INVENTION

The present invention proposes a method and a system for synchronizing information on the cloud platform. The method is realized through the synchronization of the information among different user's terminals through cloud synchronization. For example, when a user A changes his phone number, all contacts B recorded in the terminal owned by the user are capable of synchronizing the changed phone number without updating the phone number manually, thereby bringing convenience to the users.

According to the present invention, a method for synchronizing information on a cloud platform, comprises:

receiving a request of registering an account from a first user's terminal and a second user's terminal;

allocating a single ID marker and a cloud storage space to the first user's terminal and the second user's terminal and sending a message of successful registration to each of the user's terminals after receiving the request of registering the account, and the cloud storage space at each of the user's terminals comprising a permanent IDentity (ID) marker and a permanent station address;

backing up information about contact people in a directory at each of the user's terminals to each of the respective applied cloud storage spaces, and storing each of the users' contact information to his/her own cloud storage space; and updating the contact information in the cloud storage space belonging to the first user's terminal as the contact information at the first user's terminal changes, synchronizing the renewed contact information with each of the contact people's cloud storage spaces in the directory at the first user's terminal automatically, and automatically downloading, from the contact people's cloud storage spaces, the first user's renewed contact information to the contact people listed in the directory at the first user's terminal.

According to the present invention, a method for synchronizing information on a cloud platform, comprises:

receiving a user's operational command, registering a cloud account belonging to the user, and automatically allocating a cloud storage space to each of the cloud accounts belonging to each of the users;

receiving the user's operational command at each user's terminal, information about contact people in a directory at each of the user's terminals is backed up and stored in each of the respective applied cloud storage spaces, and each of the users' contact information is stored in his/her own cloud storage space; and updating the contact information in the cloud storage space belonging to the first user's terminal as the contact information at the first user's terminal changes, synchronizing the renewed contact information with each of the contact people's cloud storage spaces in the directory at the first user's terminal automatically, and automatically downloading, from the contact people's cloud storage spaces, the first user's renewed contact information to the contact people listed in the directory at the first user's terminal.

According to the present invention, a system for synchronizing information on a cloud platform, comprises:

a cloud storage space registering module, for receiving a user's operational command, registering a cloud account, and allocating a cloud storage space automatically to a cloud account belonging to each user's terminal;

a information uploading module, for controlling each of the user's terminals to receive the user's operational command, backing up contact information in the directory at each user's terminal to every cloud storage space applied by each of the users, and storing the user's contact information to his/her own cloud storage space; and a synchronization module, for updating the contact information at the first user's terminal in the cloud storage space belonging to the first user's terminal as the contact information at the first user's terminal changes, synchronizing the renewed contact information with each of the contact people's cloud storage spaces in the directory at the first user's terminal automatically, and automatically downloading, from the contact people's cloud storage spaces, the first user's renewed contact information to the contact people listed in the directory at the first user's terminal.

The present invention proposes a method and a system for synchronizing information on a cloud platform by realizing the synchronization of the information about different user's terminals through cloud synchronization based on the method and system for synchronizing information on the cloud platform. The present invention makes it possible that the user's terminals do not need to update the information about the contact people manually, which lowers probability of human errors, increasing efficiency of information transmission, and automatically updating the directory of the user's terminals in time. The present invention will bring convenience to the users.

DETAILED DESCRIPTION OF THE PREFERRED EMBODIMENTS

In order to illustrate the technique and effects of the present invention, a detailed description will be disclosed by the following disclosure in conjunction with figures. It is noted that the same components are labeled by the same number.

Except so far as otherwise expressly stated, the introduction in the embodiments of the present invention, such as steps or symbols used in the embodiments, is based on steps and symbols used in one or multiple computers. So the description will mention that the steps are operated by the computer(s) several times. The operation of the computer comprises an operation of a computer processing unit in an electronic signal in structured data. The operation converts the data or keeps the data in the slot of the memory of the computer. The operation of the computer can be reconfigured or changed according to any way with which people skilled in the art are familiar. The data structure which the data maintains is the concrete slot of the memory and has a specific characteristic defined by the data format. But, the principle of the present invention elaborated with the above-mentioned words is not a restriction. A person having ordinary skill in the art is expected to understand that multiple steps and operations as described in the following also work in the hardware.

The principle of the present invention adopts many other general or specific purpose computations, communication environments, or configurations. The operating system, environment, and configuration of the present invention frequently apply to, but not constrict to, handy phones, personal computers, servers, multi-core processors, microcomputer-based systems, main structured computers, distributed computing environment, and any system or device comprising the above-mentioned system and device.

The term "module" used in this description is taken as a software object working in the operational system. The diverse elements, modules, engines, and services used in this description are regarded as executive objects working in the operational system. The device and method introduced in this description are preferably conducted in a software method though they may be conducted in a hardware method, both of which being within the scope of the present invention.

The development of the cloud provides people with incalculable applications of public cloud storage. The more prominent public cloud storages include Sohu enterprise SkyDrive, Baidu cloud plate, Mcloud, Kuaipan, Nutstore, Kanbox, 115SkyDrive, DBank, 360Yunp, Sina, and QQ micro cloud.

Figure 1:
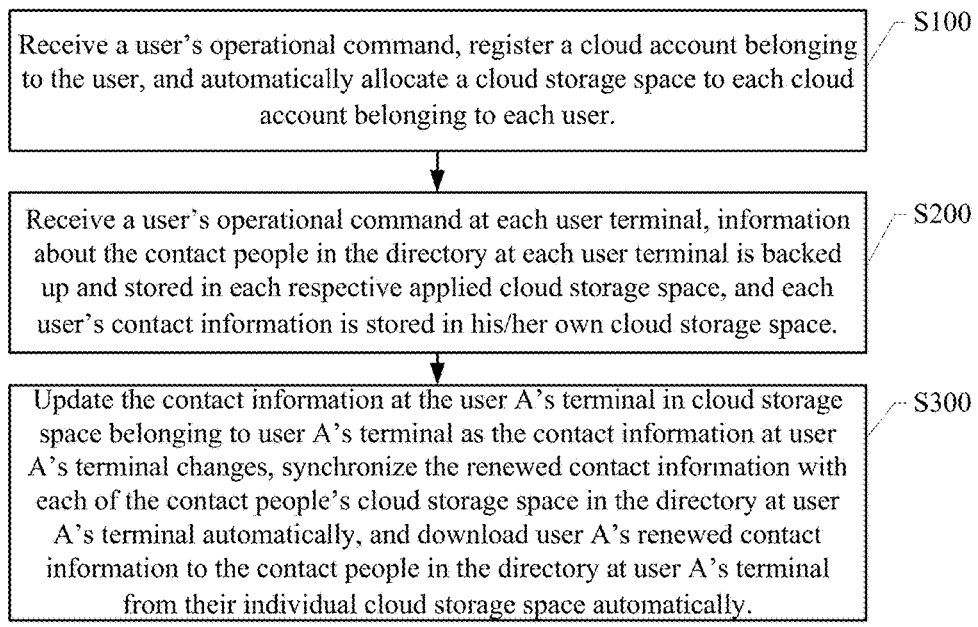
FIG. 1 is a flowchart showing a method for synchronizing information to contacts on a cloud platform according to a preferred embodiment of the present invention.

Please refer to FIG. 1. FIG. 1 is a flowchart showing a method for synchronizing information on a cloud platform. As FIG. 1 shows, the steps of the method for synchronizing information to for the cloud platform are as follows.

Step S100: Receiving a user's operational command, registering a cloud account belonging to the user, and automatically allocating a cloud storage space to each cloud account belonging to each user.

Figure 2:
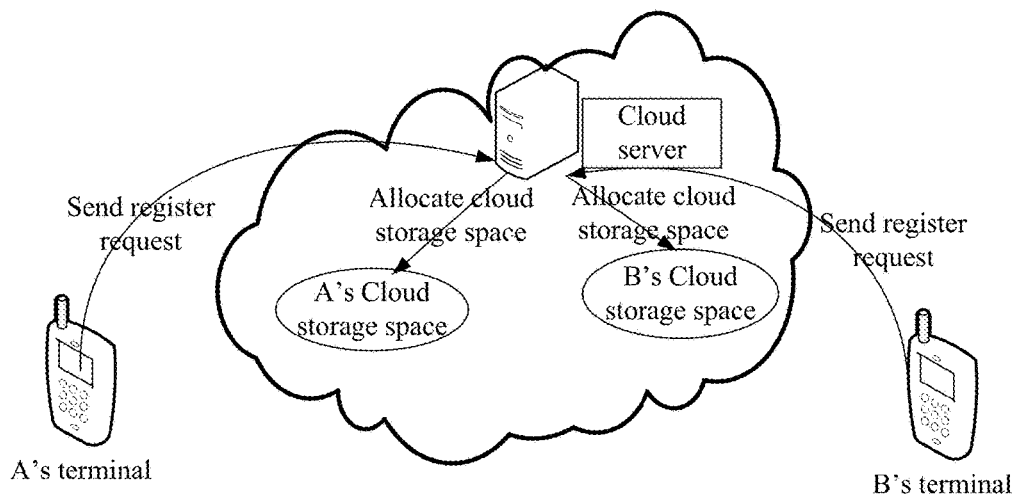
FIG. 2 shows a network configuration applying a method for synchronizing information to contacts on a cloud platform according to a preferred embodiment of the present invention.

In the present embodiment, the user registers a cloud storage space at the cloud server through the user's terminal. For example, the user A's terminal (the first user's terminal) and the B's terminal (the second user's terminal) both send a request of account registration to the cloud server, as shown in FIG. 2. After the cloud server receives the request, it allocates a single identifier and a cloud storage space to the user A's terminal and the user B's terminal. The user A's terminal is allocated the cloud storage space called as A cloud storage space. The B's terminal is allocated the cloud storage space called as B cloud storage space. Each of the user's terminals receives a message of successful registration. A permanent IDentity (ID) marker and station address are stored in each of the user's cloud storage spaces for labeling their individual cloud storage spaces and looking for their individual cloud storage spaces.

Step S200: Receiving a user's operational command at each user terminal, the information about the contact people in the directory at each user terminal is backed up and stored in each respective applied cloud storage space, and each user's contact information is stored in his/her own cloud storage space.

The user registers successfully through his/her own user's terminal. The user's terminal A and the user's terminal B both receive a user's operational command of backing up the contact information of the directory in respective user's terminals to respective cloud storage spaces and storing the individual contact information to respective cloud storage spaces as well. The contact information in the present invention comprises the user's cellphone number. The contact information further comprises, but is not restricted to, a user's QQ number, a user's WeChat number, a user's email address, a user's Momo number and/or a user's sunshine number. For example, the user's directory stored in the user's terminal, such as good friends' cellphone numbers, QQ numbers, and the backed-up information alike, can be stored in the user's cloud storage space through the user's terminal. The user's contact information, such as cellphone number, can be stored in the cloud storage space belonging to the user himself/herself.

Step S300: Updating the contact information at the user A's terminal in the cloud storage space belonging to the user A's terminal as the contact information at the user A's terminal changes, synchronizing the renewed contact information with each of the contact people's cloud storage spaces in the directory at the user A's terminal automatically, and downloading the user A's renewed contact information to the contact people in the directory at the user A's terminal from their individual cloud storage space automatically.

When contact information of one user, for example, the user A's terminal, changes, the user A can update his/her contact information stored in the user A's terminal manually. It is also possible that the cloud server for the cloud storage space automatically updates the user's contact information stored in the cloud storage space after automatically identifying the update at the user's terminal once the user logs in the cloud storage space through the user's terminal. Specific steps are as follows.

Step S31: Synchronizing the renewed contact information with the cloud storage space at the user A's terminal when the contact information at the user A's terminal changes.

Step S32: Sending the new contact information at the user A's terminal to the cloud storage spaces of the user A's friends in the directory automatically after the contact information stored in the user A's cloud storage space is synchronized.

When the user A's contact information stored in the cloud storage space for the A's terminal changes, A's new contact information is sent to all of the cloud storage spaces of A's good friends in the directory automatically. Here, the cloud storage spaces of A's good friends are the cloud storage spaces of A's good friends backed up and recorded in the A's cloud storage space.

Step S33: Identifying the user A's cloud account, changing the A's contact information after identification, and sending a message notifying the A's cloud storage space of success after the cloud storage space of the contact information in the directory at the user A's terminal receives the update of A's contact information.

After receiving the update of A's contact information, the cloud storage space of the contact information in the directory at the user A's terminal identifies user A's cloud account, that is, checking if the update request is sent by A's terminal. If it is true, the identification passes. Then, the cloud storage space of the contact information in the directory at the user A's terminal is updated. Finally, the cloud storage space of the contact information in the directory at the user A's terminal sends a message notifying A's cloud storage space of success.

Step S34: Sending a simultaneous request to each of the user's terminals corresponding to the cloud storage spaces of A's friends in the directory at the user A's terminal after the cloud storage spaces of A's friends in the directory at the user A's terminal are updated completely.

Step S35: Executing simultaneous operation of updating A's new contact information to each of the users' directories simultaneously after each of the user's terminals receives the simultaneous request.

In other words, the cloud storage space of each of A's friends updates A's latest contact information simultaneously and meanwhile sends a simultaneous request to its user's terminal automatically. Each of the user's terminals receives the simultaneous request and simultaneously operates the action of updating A's latest contact information to its directory directly and simultaneously. The simultaneous renewal of contact information is completely done.

Based on cloud simultaneity, the present invention proposes a method for allowing contact information of different user's terminals to be communicated. Once the user A changes his/her cellphone number, B (representing all contact people) in the directory at A's terminal will know and obtain A's renewed cellphone number simultaneously. It is not necessary for B to manually edit and operate. The present invention brings convenience to the users.

The present invention focuses on communication of the cloud storage space of the user A's terminal and the cloud storage spaces of all of the user A's friends in the directory at the user A's terminal on conditions that user A's contact information changes. The process of the communication is elaborated as follows.

Figure 3:
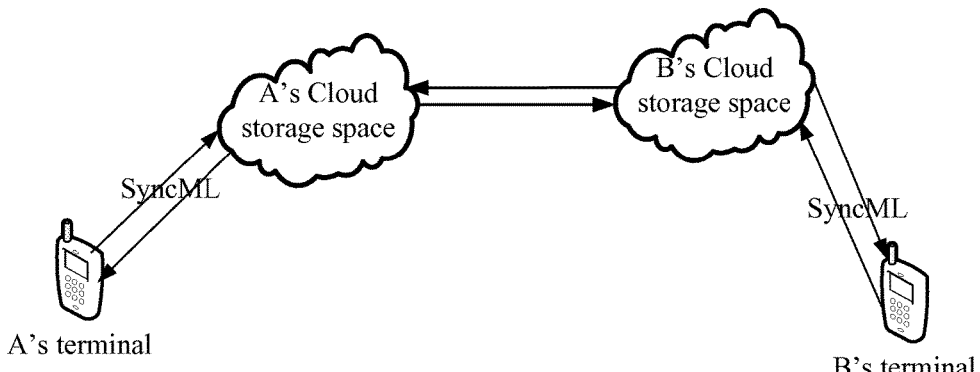
FIG. 3 is a schematic diagram of a network configuration applying a method for synchronizing information to contacts on a cloud platform according to a preferred embodiment of the present invention.

The cloud storage spaces in the embodiments of the present invention comprise a plurality of servers. These cloud storage spaces cooperate through the cluster, distributed file system (DFS), or grid computing alike. The cloud storage spaces provide the users with a certain type of storage service and access service through some application software or application interface. The servers are in charge of different tasks such as data management, space allocation, and ID verification. As FIG. 2, and FIG. 3 shows, the central server allocates the single ID marker to each of the user's terminals and manages each of the cloud storage spaces integrally. The user A's terminal corresponds to the A cloud storage space, and B corresponds to the B cloud storage space. Each of the user's terminals communicates with its cloud storage space through Synchronization Markup Language (SyncML). SyncML is the former name for a platform-independent information synchronization standard.

In Step S300, the renewed contact information synchronizes with the cloud storage spaces of all of the contact people in the directory at the user A's terminal automatically. Specifically, Step S300 comprises steps of:

Step S311: Sending a request of obtaining the address of the cloud storage space at the user B's terminal to the central server from the user A's terminal when the cloud storage space at the user A's terminal communicates with the cloud storage space at the user B's terminal.

Figure 4:
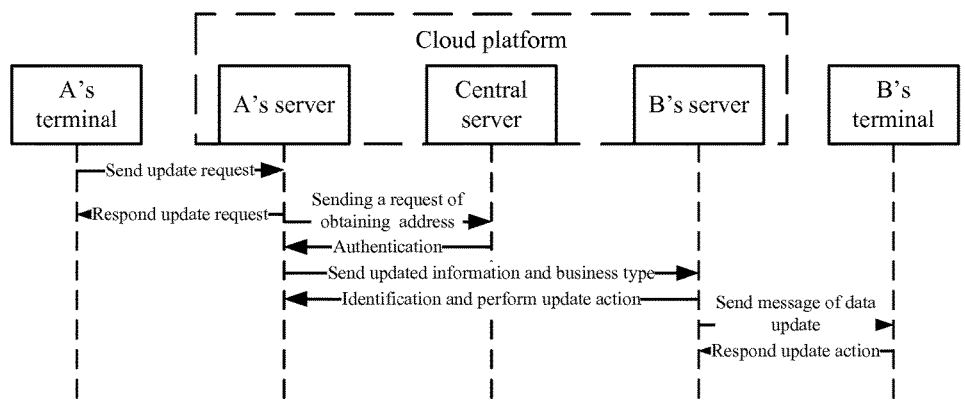
FIG. 4 is a flowchart showing a method for synchronizing information to contacts on a cloud platform according to another preferred embodiment of the present invention.

Please refer to FIG. 4. The user A sends an update request to the A's cloud server, and the A's cloud server responds to the update request. In other words, when the A's cloud server for the cloud storage space at the user A's terminal communicates with the B's cloud server for the cloud storage space at the user B's terminal, the cloud storage space at the user A's terminal sends a request of obtaining the address of the cloud storage space at the user B's terminal via a concrete operational command.

Step S321: Authenticating the cloud storage space at the user A's terminal once the central server receives the request of obtaining the address of the cloud storage space at the user B's terminal, and sending the single ID marker and the address of the cloud storage space at the user B's terminal to the cloud storage space at the user A's terminal after the authentication is proven successful.

The central server is the central server of the cloud. Each of the user's terminals in the present embodiment corresponds to one cloud server belonging to his/her own. All of the cloud servers and the central server form a cloud platform. When the central server receives a request of obtaining the address of the cloud storage space at the user B's terminal, the central server authenticates the cloud storage space at the user A's terminal to see if the cloud storage space at the user A's terminal is a cloud storage space belonging to an illegal user such as a hacker. After the authentication is proven successful, the central server sends the single ID marker and the address of the cloud storage space at the user B's terminal to the cloud storage space at the user A's terminal.

Step S331: Sending A's renewed phone number and business type at the user A's terminal to the cloud storage space at the user B's terminal after the cloud storage space at the user A's terminal receives the information about the address of the cloud storage space at the user B's terminal. That is, the renewed contact information such as cellphone number and the business type such as updated phone number are sent to the cloud storage space at the user B's terminal.

Step S341: Deciding if the phone number at the user A's terminal is simultaneously operated according to the permission issued to the user by the interior system after the cloud storage space at the user B's terminal receives the message. If the user A's terminal is one of the B's friend's terminals and owns a super permission, the cloud storage space at the user B's terminal will receive all of simultaneous update commands sent by the cloud storage space at the user A's terminal unconditionally and will obtain and save the latest phone number at the user A's terminal.

If the user A is on user B's blacklist, the cloud storage space at the user B's terminal and/or the user B's terminal will not execute any command sent by the cloud storage space at the user A's terminal or the user A's terminal.

Based on the simultaneity of the clouds, the present invention makes it possible that contact information stored at different user's terminals exchange freely. It means that all of the contact people B in the A's directory can obtain A's renewed cellphone number simultaneously without manually editing his/her own directory after A updates his/her cellphone number. Since the contact people B do not have to manually editing his/her own directory, it is convenient to the contact people B.

Figure 5:
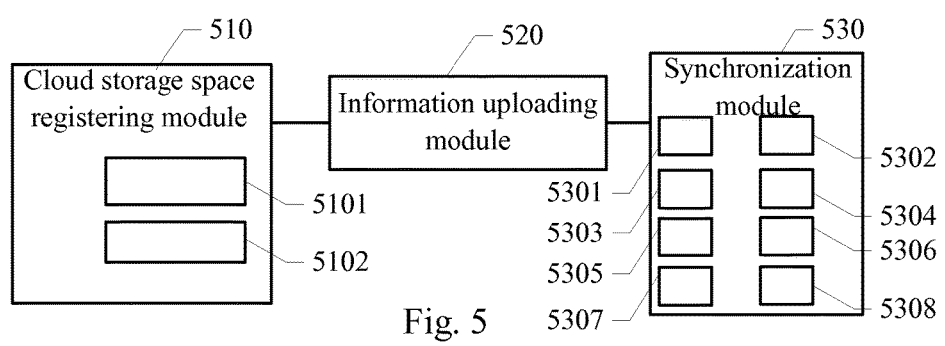
FIG. 5 is a block diagram of a system for synchronizing information to contacts on a cloud platform according to a preferred embodiment of the present invention.

Based on the above-mentioned embodiment, the present invention further comprises a system based on the simultaneous contacts sync on the cloud platform, as shown in FIG. 5. The system comprises a processor and a memory connected with the processor. The memory stores a plurality of program instructions executable by the processor to perform different functions. The plurality of program instructions comprise:

A cloud storage space registering module 510, for receiving a user's operational command, registering a cloud account, and allocating a cloud storage space automatically to a cloud account belonging to each user's terminal; details as described in Step S100.

A information uploading module 520, for controlling each of the user's terminals to receive the user's operational command, backing up the contact information in the directory at each user's terminal to every cloud storage space applied by each of the users, and storing the user's contact information to his/her own cloud storage space; details as described in Step S200.

A synchronization module 530, for updating the contact information at the user A's terminal in the cloud storage space belonging to the user A's terminal as the contact information at the user A's terminal changes, synchronizing the renewed contact information with each of the contact people's cloud storage spaces in the directory at the user A's terminal automatically, and downloading the user A's renewed contact information to the contact people in the directory at the user A's terminal from their individual cloud storage space automatically; details as described in Step S300.

The cloud storage space registering module 510 comprises:

A register command unit 5101, for dealing with requests of registering an account to the cloud server from the user A's and B's terminals; details as described above.

A cloud storage space allocating unit 5102 for allocating the single ID marker and the cloud storage space to the user A's terminal and the user B's terminal, and sending a message notifying successful registration to each of the corresponding user's terminals after controlling the cloud server to receive the request; details as described above.

Based on the simultaneous contacts sync on the cloud platform, the synchronization module 530 comprises:

An individual synchronization unit 5301, for changing and updating the user A's terminal's renewed contact information to the cloud storage space at the user A's terminal simultaneously once the user A's terminal's contact information changes; details as described above.

A synchronization processing unit 5302, for sending the renewed contact information at the user A's terminal automatically to the cloud storage spaces belonging to the contact people in the directory at the user A's terminal after the information about the contact people in the cloud storage space belonging to the user A's terminal is synchronized; details as described above.

An identifying unit 5303, for identifying the cloud account at the user A's terminal after the cloud storage spaces belonging to the contact people in the directory at the user A's terminal receive the message notifying the renewed information at the user A's terminal, performing the update of the contact information at the user A's terminal after successful identification, and sending a message notifying a successful update to the cloud storage space at the user A's terminal; details as described above.

A terminal synchronization unit 5304, for sending a simultaneous request to each of the user's terminals corresponding to the cloud storage spaces of A's friends in the directory at the user A's terminal after the cloud storage spaces of A's friends in the directory at the user A's terminal are updated completely; details as described above.

Based on the simultaneous contacts sync on the cloud platform, the synchronization module 530 further comprises:

An address request unit 5305, for sending a request of obtaining the address of the cloud storage space at the user B's terminal to the central server from the user A's terminal when the cloud storage space at the user A's terminal communicates with the cloud storage space at the user B's terminal; details as described above.

An authentication unit 5306, for authenticating the cloud storage space at the user A's terminal once the central server receives the request of obtaining the address of the cloud storage space at the user B's terminal, and sending the single ID marker and the address of the cloud storage space at the user B's terminal to the cloud storage space at the user A's terminal after the authentication is proven successful; details as described above.

A sending unit 5307, for sending A's renewed phone number and business type at the user A's terminal to the cloud storage space at the user B's terminal after the cloud storage space at the user A's terminal receives the information about the address of the cloud storage space at the user B's terminal; details as described above.

An updating unit 5308, for deciding if the cellphone at the user A's terminal is simultaneously operated according to the permission issued to the user by the interior system after the cloud storage space at the user B's terminal receives the message. If user A's terminal is one of B's friend's terminals and owns a super permission, the cloud storage space at the user B's terminal will receive all of simultaneous update commands sent by the cloud storage space at the user A's terminal unconditionally and will obtain and save the latest phone number at the user A's terminal; details as described above.

To sum up, the present invention proposes a method for realizing the synchronization of the information about different user's terminals through cloud synchronization based on the method and system for synchronizing information on the cloud platform. The present invention makes it possible that the user's terminals do not need to update the information about the contact people manually, which lowers probability of human errors, increasing efficiency of information transmission, and automatically updating the directory of the user's terminals in time. The present invention will bring convenience to the users.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. A method for synchronizing information on a cloud platform, comprising:
    receiving a request of registering an account from a first user's terminal and a second user's terminal;
    allocating a single ID marker and a cloud storage space to the first user's terminal and the second user's terminal and sending a message of successful registration to each of the user's terminals after receiving the request of registering the account, and the cloud storage space at each of the user's terminals comprising a permanent IDentity (ID) marker and a permanent station address;
    backing up information about contact people in a directory at each of the user's terminals to each of the respective applied cloud storage spaces, and storing each of the users' contact information to his/her own cloud storage space; and
    updating the contact information in the cloud storage space belonging to the first user's terminal as the contact information at the first user's terminal changes, synchronizing the renewed contact information with each of the contact people's cloud storage spaces in the directory at the first user's terminal automatically, and automatically downloading, from the contact people's cloud storage spaces, the first user's renewed contact information to the contact people listed in the directory at the first user's terminal, wherein updating the contact information in the cloud storage space belonging to the first user's terminal as the contact information at the first user's terminal changes and synchronizing the renewed contact information with each of the contact people's cloud storage spaces in the directory at the first user's terminal automatically comprises following steps of:
        changing and updating the first user's terminal's renewed contact information to the cloud storage space at the first user's terminal simultaneously once the first user's terminal's contact information changes;
        sending the renewed contact information at the first user's terminal automatically to the cloud storage spaces belonging to the contact people in the directory at the first user's terminal after the information about the contact people in the cloud storage space belonging to the first user's terminal is synchronized,
    wherein updating the contact information in the cloud storage space belonging to the first user's terminal as the contact information at the first user's terminal changes and synchronizing the renewed contact information with each of the contact people's cloud storage spaces in the directory at the first user's terminal automatically comprises following steps of:
        changing and updating the first user's terminal's renewed contact information to the cloud storage space at the first user's terminal simultaneously once the first user's terminal's contact information changes;
        sending the renewed contact information at the first user's terminal automatically to the cloud storage spaces belonging to the contact people in the directory at the first user's terminal after the information about the contact people in the cloud storage space belonging to the first user's terminal is synchronized.

2. The method as claimed in claim 1, wherein downloading the first user's renewed contact information to the contact people in the directory at the first user's terminal from their individual cloud storage spaces automatically comprises following steps of:
    identifying the first user's cloud account, changing the first user's contact information after identification, and sending a message notifying the first user's cloud storage space of success after the cloud storage space of the contact information in the directory at the first user's terminal receives the update of first user's contact information;
    sending a simultaneous request to each of the user's terminals corresponding to the cloud storage spaces of the contact information in the directory at the first user's terminal after the cloud storage spaces of the contact information in the directory at/at the first user's terminal are updated completely; and
    executing simultaneous operation of updating the first user's new contact information to each of the users' directories simultaneously after each of the user's terminals receives the simultaneous request.

3. The method as claimed in claim 1, wherein synchronizing the renewed contact information with each of the contact people's cloud storage spaces in the directory at the first user's terminal automatically comprises following steps of:
    sending a request of obtaining the address of the cloud storage space at the second user's terminal to the central server from the cloud storage at the first user's terminal when the cloud storage space at the first user's terminal communicates with the cloud storage space at the second user's terminal;
    authenticating the cloud storage space at the first user's terminal once the central server receives the request of obtaining the address of the cloud storage space at the second user's terminal, and sending the single ID marker and the address of the cloud storage space at the second user's terminal to the cloud storage space at the first user's terminal after the authentication is proven successful;
    sending the first user's renewed phone number and business type at the first user's terminal to the cloud storage space at the second user's terminal after the cloud storage space at the first user's terminal receives the information about the address of the cloud storage space at the second user's terminal; and
    deciding if the phone number at the first user's terminal is simultaneously operated according to a permission issued to the user by an interior system after the cloud storage space at the second user's terminal receives the message, and if the first user's terminal is one of the second user's friend's terminals and owns a super permission, the cloud storage space at the second user's terminal being going to receive all of simultaneous update commands sent by the cloud storage space at the first user's terminal unconditionally and being going to obtain and save the latest phone number at the first user's terminal.

4. The method as claimed in claim 3, wherein synchronizing the renewed contact information with the cloud storage spaces of all of the contact people in the directory at the first user's terminal comprises following steps of:
sending a request of obtaining the address of the cloud storage space at the second user's terminal to the central server from the first user's terminal when the cloud storage space at the first user's terminal communicates with the cloud storage space at the second user's terminal;
authenticating the cloud storage space at the first user's terminal once the central server receives the request of obtaining the address of the cloud storage space at the second user's terminal, and sending the single ID marker and the address of the cloud storage space at the second user's terminal to the cloud storage space at the first user's terminal after the authentication is proven successful;
sending the first user's renewed phone number and business type at the first user's terminal to the cloud storage space at the second user's terminal after the cloud storage space at the first user's terminal receives the information about the address of the cloud storage space at the second user's terminal; and
deciding if the phone number at the first user's terminal is simultaneously operated according to a permission issued to the user by an interior system after the cloud storage space at the second user's terminal receives the message, and if the first user's terminal is one of the second user's friend's terminals and owns a super permission, the cloud storage space at the second user's terminal being going to receive all of simultaneous update commands sent by the cloud storage space at the first user's terminal unconditionally and being going to obtain and save the latest phone number at the first user's terminal.

5. The method as claimed in claim 4, wherein deciding if the phone number at the first user's terminal is simultaneously operated according to a permission issued to the user by an interior system after the cloud storage space at the second user's terminal receives the message further comprises following steps of:
suspending the execution of every command sent by the cloud storage space at the first user's terminal at the second user's terminal if the first user's terminal is on a blacklist of the second user's terminal.

6. The method as claimed in claim 4, wherein deciding if the phone number at the first user's terminal is simultaneously operated according to a permission issued to the user by an interior system after the cloud storage space at the second user's terminal receives the message further comprises following steps of:
suspending the execution of every command sent by the first user's terminal at the second user's terminal if the first user's terminal is on a blacklist of the second user's terminal.

7. A method for synchronizing information on a cloud platform, comprising:
receiving a user's operational command, registering a cloud account belonging to the user, and automatically allocating a cloud storage space to each of the cloud accounts belonging to each of the users;
receiving the user's operational command at each user's terminal, information about contact people in a directory at each of the user's terminals is backed up and stored in each of the respective applied cloud storage spaces, and each of the users' contact information is stored in his/her own cloud storage space; and
updating the contact information in the cloud storage space belonging to the first user's terminal as the contact information at the first user's terminal changes, synchronizing the renewed contact information with each of the contact people's cloud storage spaces in the directory at the first user's terminal automatically, and automatically downloading, from the contact people's cloud storage spaces, the first user's renewed contact information to the contact people listed in the directory at the first user's terminal,
wherein updating the contact information in the cloud storage space belonging to the first user's terminal as the contact information at the first user's terminal changes and synchronizing the renewed contact information with each of the contact people's cloud storage spaces in the directory at the first user's terminal automatically, automatically downloading, from the contact people's cloud storage spaces, the first user's renewed contact information to the contact people listed in the directory at the first user's terminal comprise following steps of:
changing and updating the first user's terminal's renewed contact information to the cloud storage space at the first user's terminal simultaneously once the first user's terminal's contact information changes;
sending the renewed contact information at the first user's terminal automatically to the cloud storage spaces belonging to the contact people in the directory at the first user's terminal after the information about the contact people in the cloud storage space belonging to the first user's terminal is synchronized;
identifying the first user's cloud account, changing the first user's contact information after identification, and sending a message notifying the first user's cloud storage space of success after the cloud storage space of the contact information in the directory at the first user's terminal receives the update of first user's contact information;
sending a simultaneous request to each of the user's terminals corresponding to the cloud storage spaces of the contact information in the directory at the first user's terminal after the cloud storage spaces of the contact information in the directory at the first user's terminal are updated completely; and
executing simultaneous operation of updating the first user's new contact information to each of the users' directories simultaneously after each of the user's terminals receives the simultaneous request.

8. The method as claimed in claim 7, wherein receiving the user's operational command, registering the cloud account belonging to the user, and automatically allocating the cloud storage space to each of the cloud accounts belonging to each of the users further comprises following steps of:
supplying each of the users with a permanent ID marker and a permanent station address.

9. The method as claimed in claim 7, wherein receiving the user's operational command, registering the cloud account belonging to the user, and automatically allocating the cloud storage space to each of the cloud accounts belonging to each of the users comprises following steps of:
- sending a request of registering an account to a cloud server from a first user's terminal and a second user's terminal; and
- allocating a single ID marker and a cloud storage space to the first user's terminal and the second user's terminal and sending a message of successful registration to each of the user's terminals after the cloud server receives the request.

10. The method as claimed in claim 7, wherein synchronizing the renewed contact information with each of the contact people's cloud storage spaces in the directory at the first user's terminal automatically comprises following steps of:
- sending a request of obtaining the address of the cloud storage space at the second user's terminal to the central server from the first user's terminal when the cloud storage space at the first user's terminal communicates with the cloud storage space at the second user's terminal;
- authenticating the cloud storage space at the first user's terminal once the central server receives the request of obtaining the address of the cloud storage space at the second user's terminal, and sending the single ID marker and the address of the cloud storage space at the second user's terminal to the cloud storage space at the first user's terminal after the authentication is proven successful;
- sending the first user's renewed phone number and business type at the first user's terminal to the cloud storage space at the second user's terminal after the cloud storage space at the first user's terminal receives the information about the address of the cloud storage space at the second user's terminal; and
- deciding if the phone number at the first user's terminal is simultaneously operated according to a permission issued to the user by an interior system after the cloud storage space at the second user's terminal receives the message, and if the first user's terminal is one of the second user's friend's terminals and owns a super permission, the cloud storage space at the second user's terminal being going to receive all of simultaneous update commands sent by the cloud storage space at the first user's terminal unconditionally and being going to obtain and save the latest phone number at the first user's terminal.

11. The method as claimed in claim 10, wherein deciding if the phone number at the first user's terminal is simultaneously operated according to a permission issued to the user by an interior system after the cloud storage space at the second user's terminal receives the message further comprises following steps of:
- suspending the execution of every command sent by the cloud storage space at the first user's terminal at the second user's terminal if the first user's terminal is on a blacklist of the second user's terminal.

12. The method as claimed in claim 10, wherein deciding if the phone number at the first user's terminal is simultaneously operated according to a permission issued to the user by an interior system after the cloud storage space at the second user's terminal receives the message further comprises following steps of:
- suspending the execution of every command sent by the first user's terminal at the second user's terminal if the first user's terminal is on a blacklist of the second user's terminal.

13. A system for synchronizing information on a cloud platform, comprising:
- a processor; and
- a memory connected with the processor, the memory comprising a plurality of program instructions executable by the processor, the plurality of program instructions comprising:
- a cloud storage space registering module, configured to cause the processor to receive a user's operational command, to register a cloud account, and to allocate a cloud storage space automatically to a cloud account belonging to each user's terminal;
- a information uploading module, configured to cause the processor to control each of the user's terminals to receive the user's operational command, to back up contact information in the directory at each user's terminal to every cloud storage space applied by each of the users, and to store the user's contact information to his/her own cloud storage space; and
- a synchronization module, configured to cause the processor to update the contact information at the first user's terminal in the cloud storage space belonging to the first user's terminal as the contact information at the first user's terminal changes, to synchronize the renewed contact information with each of the contact people's cloud storage spaces in the directory at the first user's terminal automatically, and to automatically download, from the contact people's cloud storage spaces, the first user's renewed contact information to the contact people listed in the directory at the first user's terminal,
wherein the synchronization module comprises:
- an individual synchronization unit, configured to cause the processor to change and update the first user's terminal's renewed contact information to the cloud storage space at the first user's terminal simultaneously once the first user's terminal's contact information changes;
- a identifying unit, configured to cause the processor to identify the cloud account at the first user's terminal after the cloud storage spaces belonging to the contact people in the directory at the first user's terminal receive the message notifying the renewed information at the first user's terminal, to perform the update of the contact information at the first user's terminal after successful identification, and to send a message notifying a successful update to the cloud storage space at the first user's terminal; and
- a synchronization processing unit, configured to cause the processor to send the renewed contact information at the first user's terminal automatically to the cloud storage spaces belonging to the contact people in the directory at the first user's terminal after the information about the contact people in the cloud storage space belonging to the first user's terminal is synchronized.

14. The system as claimed in claim 13, wherein the processing module for registering the cloud storage space comprises:
- a register command unit, configured to cause the processor to deal with requests of registering an account to the cloud server from the first user's terminal and the second user's terminal; and
- a cloud storage space allocating unit, configured to cause the processor to allocate a single ID marker and a cloud storage space to the first user's terminal and the second user's terminal and to send a message notifying successful registration to each of the corresponding user's terminals after controlling the cloud server to receive the request.

15. The system as claimed in claim 13, wherein the synchronization module further comprises:
   a address request unit, configured to cause the processor to send a request of obtaining the address of the cloud storage space at the second user's terminal to the central server from the first user's terminal when the cloud storage space at the first user's terminal communicates with the cloud storage space at the second user's terminal;
   a authentication unit, configured to cause the processor to authenticate the cloud storage space at the first user's terminal once the central server receives the request of obtaining the address of the cloud storage space at the second user's terminal, and to send the single ID marker and the address of the cloud storage space at the second user's terminal to the cloud storage space at the first user's terminal after the authentication is proven successful;
   a sending unit, configured to cause the processor to send the first user's renewed phone number and business type at the first user's terminal to the cloud storage space at the second user's after the cloud storage space at the first user's terminal receives the information about the address of the cloud storage space at the second user's terminal; and
   a updating unit, configured to cause the processor to decide if the cellphone at the first user's terminal is simultaneously operated according to the permission issued to the user by the interior system after the cloud storage space at the second user's terminal receives the message, and if the first user's terminal is one of the second user's friend's terminals and owns a super permission, the cloud storage space at the second user's terminal being going to receive all of simultaneous update commands sent by the cloud storage space at the first user's terminal unconditionally and being going to obtain and save the latest phone number at the first user's terminal.

16. The system as claimed in claim 15, wherein the synchronization module is further used in:
   suspending the execution of every command sent by the cloud storage space at the first user's terminal at the second user's terminal if the first user's terminal is on a blacklist of the second user's terminal.

17. The system as claimed in claim 15, wherein the synchronization module is further used in:
   suspending the execution of every command sent by the first user's terminal at the second user's terminal if the first user's terminal is on a blacklist of the second user's terminal.

* * * * *